US 12,490,867 B2

(12) United States Patent
Bi et al.

(10) Patent No.: US 12,490,867 B2
(45) Date of Patent: Dec. 9, 2025

(54) SUCKER ARMREST OF MANUAL AIR SUCTION TYPE

(71) Applicant: Tiedeping Hardware Plastic (Shenzhen) Co., Ltd., Guangdong (CN)

(72) Inventors: Xiaofeng Bi, Guangdong (CN); Lin Liang, Guangdong (CN)

(73) Assignee: TIEDEPING HARDWARE PLASTIC (SHENZHEN) CO., LTD., Guangdong (CN)

( * ) Notice: Subject to any disclaimer, the term of this patent is extended or adjusted under 35 U.S.C. 154(b) by 79 days.

(21) Appl. No.: 18/422,956

(22) Filed: Jan. 25, 2024

(65) Prior Publication Data

US 2024/0382044 A1 Nov. 21, 2024

(30) Foreign Application Priority Data

May 19, 2023 (CN) .......................... 202321229070.5

(51) Int. Cl.
*A47K 3/00* (2006.01)
*F16B 47/00* (2006.01)

(52) U.S. Cl.
CPC .............. *A47K 3/003* (2013.01); *F16B 47/00* (2013.01)

(58) Field of Classification Search
CPC ................................. A47K 3/003; F16B 47/00
See application file for complete search history.

(56) References Cited

U.S. PATENT DOCUMENTS

| 3,240,525 | A | * | 3/1966 | Wood | B65G 49/061 |
| | | | | | 294/185 |
| 5,639,134 | A | * | 6/1997 | Rusch | B25G 1/10 |
| | | | | | 294/187 |
| 5,772,823 | A | * | 6/1998 | Rusch | B65G 49/061 |
| | | | | | 156/98 |
| D557,127 | S | * | 12/2007 | Lee | D8/380 |
| D639,409 | S | * | 6/2011 | Gilbert | D23/304 |
| 11,731,291 | B2 | * | 8/2023 | Rotem | B25J 15/0616 |
| | | | | | 294/183 |
| 2009/0166490 | A1 | * | 7/2009 | Liao | F16B 47/00 |
| | | | | | 248/205.8 |

* cited by examiner

*Primary Examiner* — Christine J Skubinna
(74) *Attorney, Agent, or Firm* — MUNCY, GEISSLER, OLDS & LOWE, P.C.

(57) ABSTRACT

The present disclosure relates to a sucker armrest of manual air suction type. The sucker armrest includes a handle, a cover and an air sucker. The handle is fixed on the cover, and the air sucker is fixed in the cover. The air sucker includes a manual air pump, a disc and a steel ring. The steel ring is embedded in the disc, and the cover is fixedly connected to the steel ring through screws. The manual air pump is provided between the disc and the cover. An air port of the manual air pump communicates with a suction surface of the disc. When the suction force of the sucker decreases, the manual air pump can be directly used for vacuumizing to increase the suction force, without the step of detaching and reattaching the sucker, which simplifies the process of re-increasing the suction force and improves the convenience of use.

9 Claims, 3 Drawing Sheets

SUCKER ARMREST OF MANUAL AIR SUCTION TYPE

TECHNICAL FIELD

The present disclosure relates to a sucker armrest, and in particular to a sucker armrest of manual air suction type.

BACKGROUND ART

Sucker armrests are usually configured to be installed and fixed on walls or doors of bathrooms or restrooms for force borrowing. Common sucker armrests on the market usually have two suckers, which are connected by a long rod. The two suckers are usually pull-rod suckers. When the pull-rod sucker is in use, it can generate vacuum at one time to form suction force by controlling a pull rod. However, if the sealing is insufficient, the vacuum degree will gradually decrease after prolonged use, resulting in insufficient suction force. If the suction force needs to be increased again, it is necessary to control the pull rod to reduce the vacuum degree to zero, detach the sucker from a surface that it is sucked to, then reattach the sucker to a proper position, and finally control the pull rod to generate vacuum to form a suction force. The whole process is relatively cumbersome, and the convenience of use is not good, so it needs to be improved.

SUMMARY

The purpose of the present disclosure is to overcome the above defect of the prior art, and provide a sucker armrest of manual air suction type to improve the convenience of use.

In order to achieve the above purpose, the present disclosure uses the following technical solution: a sucker armrest of manual air suction type, which includes a handle, a cover and an air sucker. The handle is fixed on the cover, and the air sucker is fixed in the cover. The air sucker includes a manual air pump, a disc and a steel ring. The steel ring is embedded in the disc, and the cover is fixedly connected to the steel ring through screws. The manual air pump is provided between the disc and the cover. An air port of the manual air pump communicates with a suction surface of the disc, and an operating rod of the manual air pump runs through the cover.

The cover is provided with two mounting surfaces, and the mounting surfaces are provided with screw holes. Screws protruding from two ends of the handle are screwed into the screw holes respectively to firmly connect the handle to the cover.

The mounting surfaces are also provided with positioning posts, and the two ends of the handle are respectively provided with corresponding positioning holes. When the handle is mounted on the cover, the positioning posts are inserted into the positioning holes.

The two ends of the handle are respectively provided with extension plates, the cover is provided with corresponding notches, and the extension plates cover in the notches.

An end surface of the extension plate is provided with an outwardly extending tab. The tab is inserted through the notch and snapped into a buckle in the inner wall of the cover.

The end surface of the extension plate is also provided with inserting plates which extend outwardly, and the inner wall of the cover is provided with corresponding guide grooves. The guide grooves extend to the notch, and the inserting plates are inserted through the notch and into the guide grooves.

Two parallel partition plates are provided inside the cover. The two partition plates divide the cover into a middle cavity and two side cavities. The manual air pump is provided in the middle cavity between the two partition plates, and the notches are respectively provided in walls of the two side cavities.

The partition plates and the inner walls of the side cavities are snapped with cover plates, and the periphery of the cover plates are fitted to the inner walls of the side cavities and the side surfaces of the partition plates.

Reinforcing rib plates are provided between the partition plates and the inner walls of the side cavities. The upper part of each of the reinforcing rib plates is provided with a recess, and the cover plates are provided with corresponding necks. The necks are inserted into the recesses to form a snap connection. Cylinders are provided in the cover.

The cylinders are used for inserting screws to connect the steel ring, and the partition plates and the reinforcing rib plates intersect at the cylinders.

Compared with the prior art, the beneficial effect of the present disclosure is as follows: the sucker is provided with a manual air pump for vacuumizing to form a suction force, and when the suction force of the sucker decreases, the manual air pump can be directly used for vacuumizing to increase the suction force of the sucker, without the step of detaching and reattaching the sucker, which simplifies the process of re-increasing the suction force and improves the convenience of use.

The above description is merely an overview of the technical solution of the present disclosure. In order to understand the technical means of the present disclosure more clearly, it can be implemented in accordance with the content of the specification, and in order to make the above and other purposes, features and advantages of the present disclosure more obvious and easier to understand, preferred embodiments are specifically cited below, which are described in detail as follows.

DETAILED DESCRIPTION OF EMBODIMENTS

In order to make the purpose, technical solution and advantages of the present disclosure clearer, the present disclosure will be further described in detail below with reference to the accompanying drawings and specific embodiments.

The technical solution in the embodiments of the present disclosure will be clearly and completely described below in conjunction with the accompanying drawings of the embodiments of the present disclosure; and obviously, the embodiments described are merely some, rather than all, of the embodiments of the present disclosure. All other embodiments obtained by those skilled in the art based on the embodiments of the present disclosure without any creative effort shall fall within the protection scope of the present disclosure.

Figure 1:
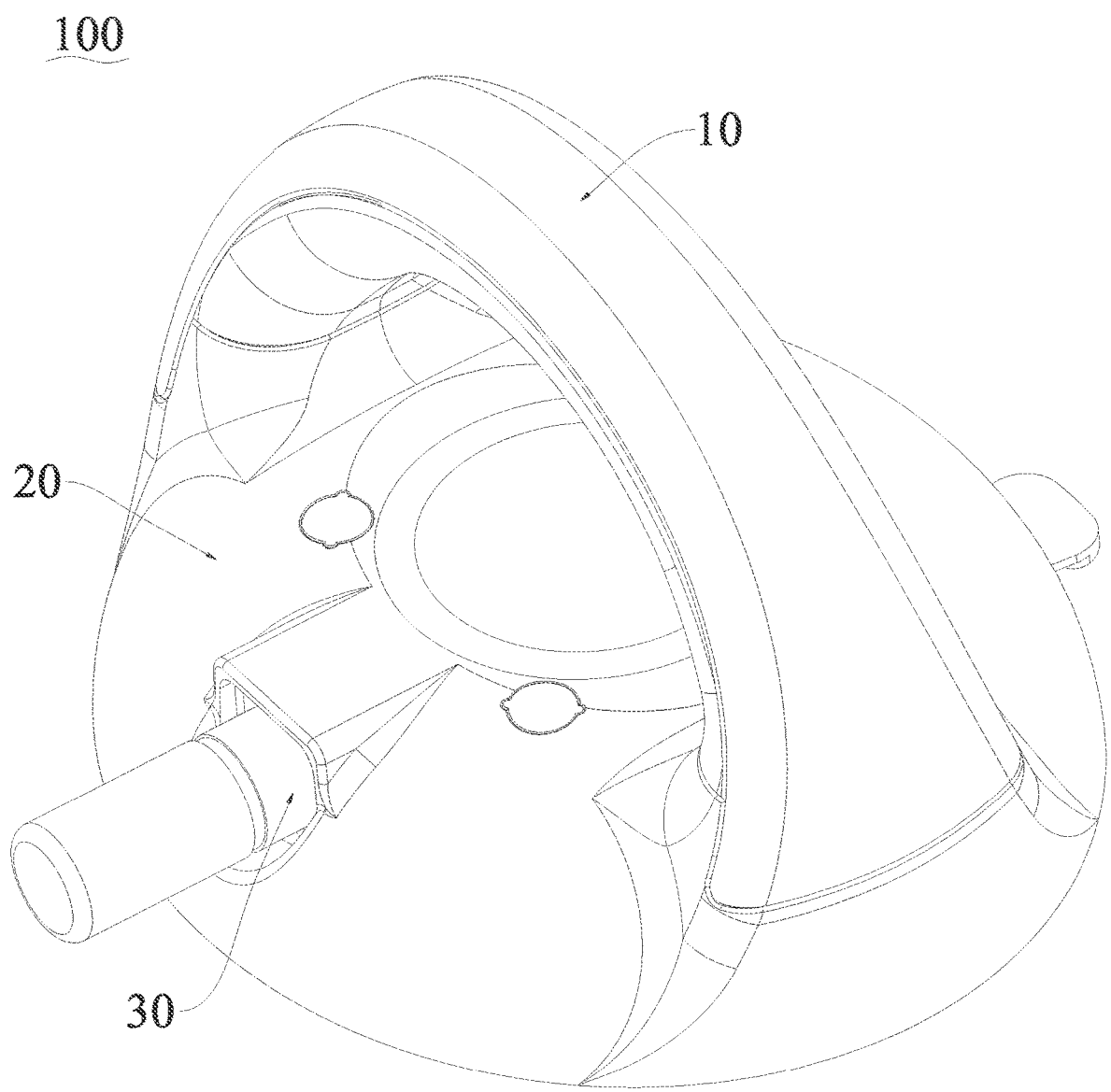
FIG. 1 is a three-dimensional view of a sucker armrest that is assembled according to the present disclosure.
Figure 2:
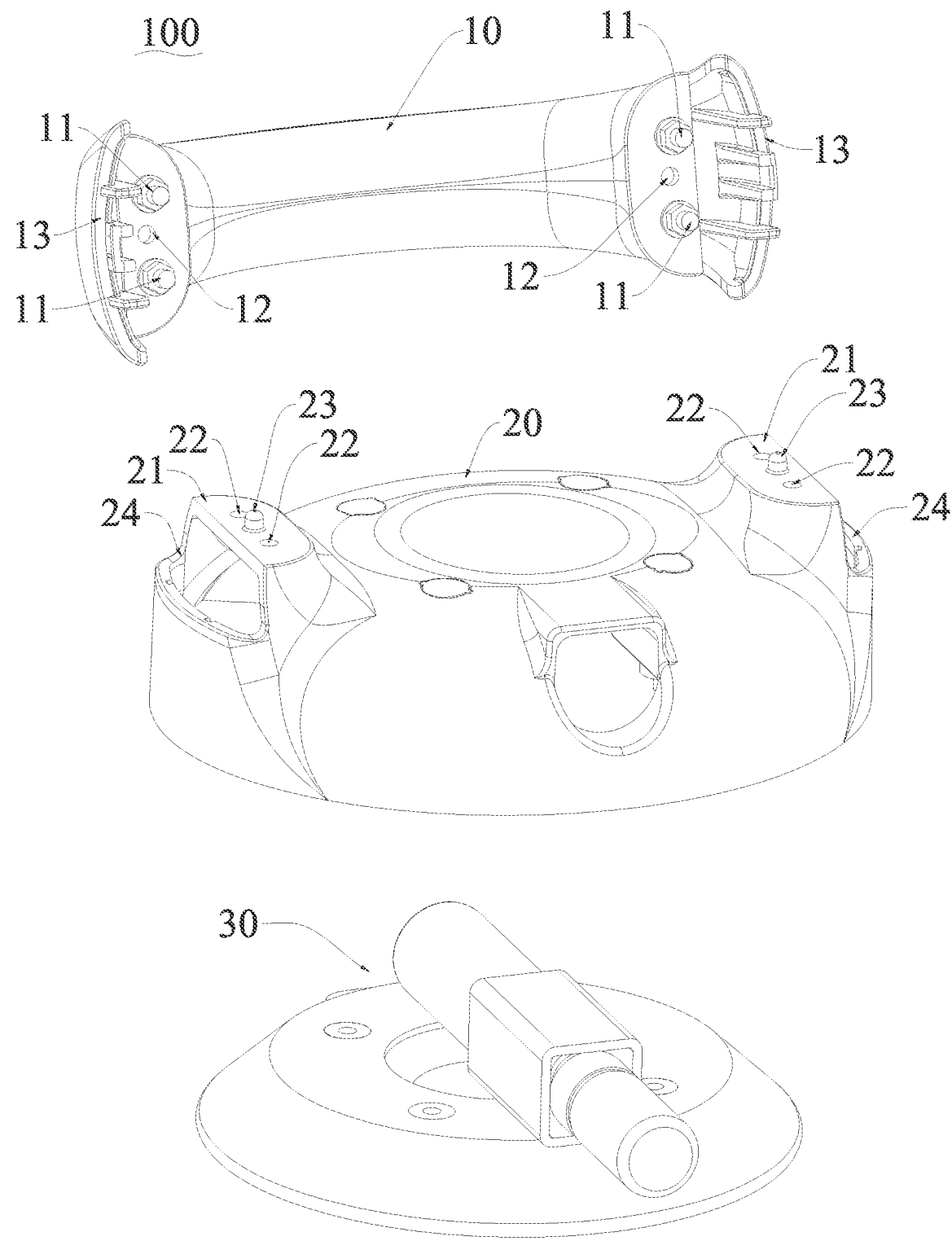
FIG. 2 is an exploded view of a sucker armrest according to the present disclosure.
Figure 3:
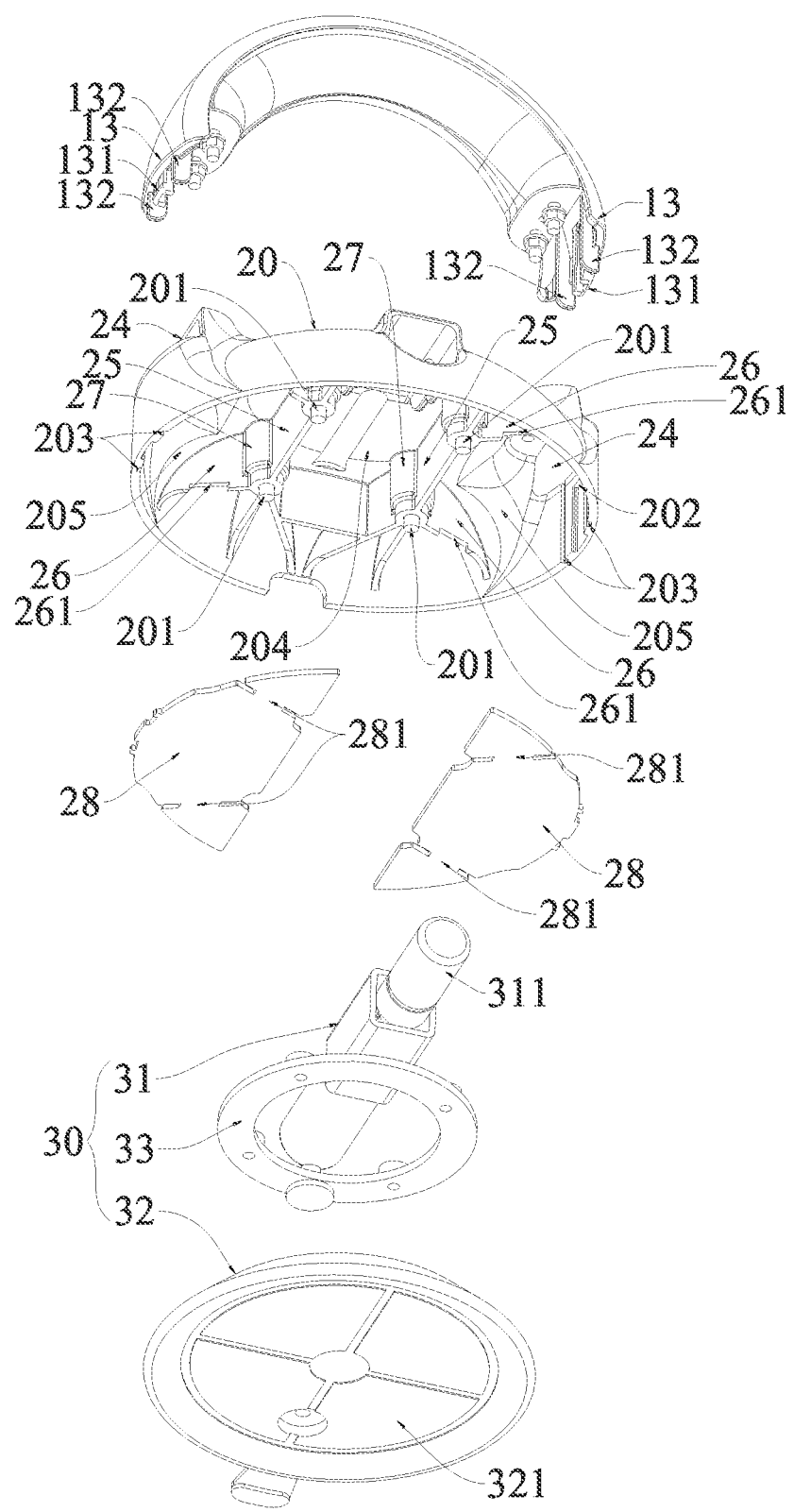
FIG. 3 is an exploded view of a sucker armrest according to the present disclosure.

An embodiment of the present disclosure is a sucker armrest of manual air suction type, and its specific structure is shown in FIGS. 1 to 3.

As shown in FIGS. 1 and 2, the sucker armrest 100 includes a handle 10, a cover 20 and an air sucker 30. The handle 10 is fixed on the cover 20, and the air sucker 30 is fixed in the cover 20.

As shown in FIG. 2, the cover 20 is provided with two mounting surfaces 21, and each of the mounting surfaces 21 is provided with two screw holes 22. Screws 11 protruding from two ends of the handle 10 are screwed into the screw holes 22 respectively to firmly connect the handle 10 to the cover 20. In addition, as shown in FIG. 2, each of the mounting surfaces 21 is also provided with a positioning post 23. The positioning post 23 is between the two screw holes 22, and the two ends of the handle 10 are respectively provided with corresponding positioning holes 12. When the handle 10 is mounted on the cover 20, the positioning posts 23 are inserted into the positioning holes 12.

In some embodiments, as shown in FIG. 2, the two ends of the handle 10 are respectively provided with extension plates 13. The cover 20 is provided with corresponding notches 24. The extension plates 13 cover in the notches 24.

As shown in FIG. 3, the air sucker 30 includes a manual air pump 31, a disc 32 and a steel ring 33. The steel ring 33 is embedded in the disc 32, and the cover 20 is fixedly connected to the steel ring 33 through screws 201. The manual air pump 31 is provided between the disc 32 and the cover 20. An air port of the manual air pump 31 communicates with a suction surface 321 of the disc 32, and an operating rod 311 of the manual air pump 31 runs through the cover 20.

In some embodiments, as shown in FIG. 3, an end surface of the extension plate 13 is provided with an outwardly extending tab 131. The tab 131 is inserted through the notch 24 and snapped into a buckle 202 in the inner wall of the cover 20. In addition, the end surface of the extension plate 13 is also provided with two inserting plates 132 which extend outwardly, and the inner wall of the cover 20 is provided with corresponding guide grooves 203. The guide grooves 203 extend to the notch 24, and the inserting plates 132 are inserted through the notch 24 and into the guide grooves 203.

In some embodiments, as shown in FIG. 3, two parallel partition plates 25 are provided inside the cover 20. The two partition plates 25 divide the cover 20 into a middle cavity 204 and two side cavities 205. The manual air pump 31 is provided in the middle cavity 204 between the two partition plates 25, and the two notches 24 of the cover 20 are respectively provided in walls of the two side cavities 205. In addition, the partition plates 25 and the inner walls of the side cavities 205 are snapped with cover plates 28, and the periphery of the cover plates 28 are fitted to the inner walls of the side cavities 205 and the side surfaces of the partition plates 25. The cover plates 25 can separate the notches 24 from the air sucker 30.

In some embodiments, as shown in FIG. 3, erected reinforcing rib plates 26 are provided between the partition plates 25 and the inner walls of the side cavities 205. The upper part of each of the reinforcing rib plates 26 is provided with a recess 261, and the cover plates 28 are provided with corresponding necks 281. The necks 281 are inserted into the recesses 261 to form a snap connection. In addition, as shown in FIG. 3, four cylinders 27 are provided in the cover 20. The cylinders 27 are used for inserting screws 201 to connect the steel ring 33, and the partition plates 25 and the reinforcing rib plates 26 intersect at the cylinders 27.

In the sucker armrest 100 of the above embodiment, the air sucker 30 is provided with a manual air pump 31 for vacuumizing to form a suction force. When the suction force of the air sucker 30 decreases, the manual air pump 31 can be directly used for vacuumizing to increase the suction force of the sucker, without the step of detaching and reattaching the sucker, which simplifies the process of re-increasing the suction force and improves the convenience of use.

In the description of this specification, descriptions with reference to terms "one embodiment", "some embodiments", "an example", "a specific example", or "some examples" etc., mean specific features, structures, materials or characteristics described in conjunction with the embodiment(s) or example(s) are included in at least one embodiment or example of the present disclosure. In this specification, the schematic representation of the above-mentioned terms should not be constructed as necessarily referring to the same embodiment or example. Moreover, the described specific features, structures, materials or characteristics may be combined in any one or more embodiments or examples in a suitable manner. In addition, those skilled in the art may combine different embodiments or examples described in this specification.

The above only uses embodiments to further illustrate the technical content of the present disclosure, so as to make it easier for readers to understand, but it does not mean that the implementation of the present disclosure is limited to this. Any technical extension or re-creation made in accordance with the present disclosure is all protected by the present disclosure. The protection scope of the present disclosure is defined by the claims.

The invention claimed is:

1. A sucker armrest forof manual air suction-type, comprising
   a handle,
   a cover, and
   an air sucker,
   wherein the handle is fixed on the cover, the air sucker is fixed in the cover, the air sucker comprises a manual air pump, a disc and a steel ring, the steel ring is embedded in the disc, the cover is fixedly connected to the steel ring through screws, the manual air pump is provided between the disc and the cover, an air port of the manual air pump communicates with a suction surface of the disc, and an operating rod of the manual air pump runs through the cover;
   wherein the cover is provided with two mounting surfaces, the mounting surfaces are provided with screw holes, and screws protruding from two ends of the handle are screwed into the screw holes respectively to firmly connect the handle to the cover.

2. The sucker armrest of claim 1, wherein the mounting surfaces are also provided with positioning posts, the two ends of the handle are respectively provided with corresponding positioning holes, and when the handle is mounted on the cover, the positioning posts are inserted into the positioning holes.

3. A sucker armrest for manual air suction, comprising:
   a handle,
   a cover, and
   an air sucker,
   wherein the handle is fixed on the cover, the air sucker is fixed in the cover, the air sucker comprises a manual air pump, a disc and a steel ring, the steel ring is embedded in the disc, the cover is fixedly connected to the steel ring through screws, the manual air pump is provided between the disc and the cover, an air port of the manual air pump communicates with a suction surface of the disc, and an operating rod of the manual air pump runs through the cover;

wherein the two ends of the handle are respectively provided with extension plates, the cover is provided with corresponding notches, and the extension plates cover in the notches.

4. The sucker armrest of claim 3, wherein an end surface of the extension plate is provided with an outwardly extending tab, and the tab is inserted through the notch and snapped into a buckle in the inner wall of the cover.

5. The sucker armrest of claim 3, wherein the end surface of the extension plate is also provided with inserting plates which extend outwardly, the inner wall of the cover is provided with corresponding guide grooves, the guide grooves extend to the notch, and the inserting plates are inserted through the notch and into the guide grooves.

6. The sucker armrest of claim 3, wherein two parallel partition plates are provided inside the cover, the two partition plates divide the cover into a middle cavity and two side cavities, the manual air pump is provided in the middle cavity between the two partition plates, and the notches are respectively provided in walls of the two side cavities.

7. The sucker armrest of claim 6, wherein the partition plates and the inner walls of the side cavities are snapped with cover plates, and the periphery of the cover plates are fitted to the inner walls of the side cavities and the side surfaces of the partition plates.

8. The sucker armrest of claim 7, wherein reinforcing rib plates are provided between the partition plates and the inner walls of the side cavities, the upper part of each of the reinforcing rib plates is provided with a recess, the cover plates are provided with corresponding necks, and the necks are inserted into the recesses to form a snap connection.

9. The sucker armrest of claim 8, wherein cylinders are provided in the cover, the cylinders are used for inserting screws to connect the steel ring, and the partition plates and the reinforcing rib plates intersect at the cylinders.

* * * * *